(12) United States Patent
Hashizume et al.

(10) Patent No.: US 8,139,933 B2
(45) Date of Patent: Mar. 20, 2012

(54) IMAGING DEVICE

(75) Inventors: Jiro Hashizume, Toride (JP); Ikuo Shinta, Hitachinaka (JP); Yoshiaki Yamauchi, Omitama (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 12/913,911

(22) Filed: Oct. 28, 2010

(65) Prior Publication Data
US 2011/0103784 A1    May 5, 2011

(30) Foreign Application Priority Data
Nov. 4, 2009    (JP) .................................. 2009-252564

(51) Int. Cl.
*G03B 3/10*    (2006.01)
*G02B 7/04*    (2006.01)
(52) U.S. Cl. ........................................ 396/133; 396/144
(58) Field of Classification Search .................. 396/133, 396/144
See application file for complete search history.

(56) References Cited

U.S. PATENT DOCUMENTS

| | | | |
|---|---|---|---|
| 2006/0098968 A1* | 5/2006 | Ito et al. ........................... | 396/85 |
| 2007/0280668 A1* | 12/2007 | Kubo et al. ..................... | 396/133 |
| 2011/0044679 A1* | 2/2011 | Yoshida et al. ................ | 396/133 |
| 2011/0091193 A1* | 4/2011 | Lim et al. ....................... | 396/133 |
| 2011/0242398 A1* | 10/2011 | Honda et al. ................... | 348/345 |

FOREIGN PATENT DOCUMENTS

| | | |
|---|---|---|
| JP | 2003-111458 | 4/2003 |
| JP | 2009-041545 | 2/2009 |

\* cited by examiner

*Primary Examiner* — Rodney Fuller
(74) *Attorney, Agent, or Firm* — Antonelli, Terry, Stout & Kraus, LLP.

(57) ABSTRACT

A metal pin is inserted into a hole cylindrically formed in a camera casing so as to be in contact with a shape-memory actuator. The metal pin and the shape-memory actuator are fixed by pressurization. The metal pin is further bonded to a printed circuit board via a solder to electrically and thermally contact the shape-memory actuator and the printed circuit board so as to form the camera module by reducing the wiring size and improving the cooling efficiency.

20 Claims, 10 Drawing Sheets

IMAGING DEVICE

TECHNICAL FIELD

The present invention relates to a compact imaging device installed in a mobile phone and the like for use.

BACKGROUND ART

Generally, a compact camera module installed in the mobile phone for use is structured to drive a lens using a stepping motor, a voice coil motor and a piezoelectric motor for the purpose of adjusting focus and changing a magnification percentage. The aforementioned structure is so complicated that the size reduction is limited, resulting in disadvantage of cost increase. A compact camera module is disclosed in Japanese Unexamined Patent Application Publication No. 2003-111458, which employs a shape-memory actuator with simple structure and compact size for cost reduction. The aforementioned actuator is structured to bring a center curved portion of the U-like shape-memory-alloy in contact with a lens guide portion provided at one side of a lens holder, and slidably move the lens holder along the guide under the heat resulting from current application.

The related art disclosed in Japanese Unexamined Patent Application Publication No. 2003-111458 is not provided with a mechanism for cooling the actuator, thus deteriorating the response of the actuator to the driving operation during cooling. Direct fixation between the actuator and the printed circuit board via a solder hardly allows flexibility for setting the mount position on the printed board. As a result, the area for installing the camera module is enlarged. Under the heat resulting from current application to the actuator causes thermal expansion of the actuator, thus deteriorating the contact between the actuator and the solder.

Japanese Unexamined Patent Application Publication No. 2009-41545 discloses the structure for sealing the shape-memory-alloy which generates heat and the image pickup device within the lens holder. The heat release of the shape-memory actuator is deteriorated to impair the response during cooling. The temperature of the image pickup device is also increased to raise noise level, resulting in deteriorated image quality.

SUMMARY OF THE INVENTION

It is an object of the present invention to provide a highly reliable camera module provided with an actuator which allows size reduction of the camera module.

In an actuator device according to the present invention, provided are a camera casing, a lens holder slidably attached to a shaft formed at the center of the casing, a plate spring provided to constantly press the lens holder, a support beam of the lens holder, which is formed on its circumference for supporting the lens holder, operation means using an actuator of current application heat type with a V-like shape, which thermally expands and contracts having terminals provided at both ends of one side of the casing while applying a pressing force against a force of the plate spring applied to the lens holder, and a conductive metal pin having one end surface conically chamfered. The metal pin is inserted into a cylindrical hole formed in the camera casing to be in contact with the actuator, and further pressurizes to electrically contact the metal pin and the shape-memory actuator, and to fix the actuator to the casing.

In the actuator device of the camera module according to the invention, one end of the metal pin is electrically connected to an electric wiring pattern formed on the printed circuit board via an adhesive agent as a solder so as to apply the drive current from the printed circuit board to the shape-memory actuator. Heat generated by the shape-memory actuator is thermally conducted to the printed circuit board via the metal pin and the solder each serving as a good thermal conductor. The shape-memory actuator may exhibit good heat release property and reduce the wiring size.

In the actuator device of the camera module, the actuator is of voltage drive type, for example, ion-conducting polymer actuator.

In the actuator device of the camera module, one end of the metal pin is thermally connected to the plate spring. The heat generated by the shape-memory actuator is thermally conducted to the plate spring via the metal pin serving as the good thermal conductor. The shape-memory actuator may exhibit improved heat release property.

In the actuator device of the camera module according to the invention, a support beam of the lens holder is provided above the upper surface of the lens holder, and the actuator is provided near a centrally positioned lens.

In the actuator device of the camera module according to the invention, the actuator is electrically connected to the metal pin via a conductive material, for example, a conductive adhesive agent.

In the actuator device of the camera module according to the invention, each of the lens holder and the support beam exhibits good thermal conductivity.

In the actuator device of the camera module according to the invention, the polymer actuator is employed as the actuator device.

In the actuator device of the camera module according to the invention, a shape-memory-alloy is used for forming the actuator.

In the actuator device of the camera module according to the invention, a polymer actuator of current application heat type is employed as the actuator.

In the camera module as the imaging device according to the invention using the shape-memory actuator of general current application heat type, the response speed is regulated in accordance with the heat release rate of the shape-memory actuator. The joint portion between the shape-memory actuator and the electrode for current application has a large difference of the expansion rate upon current application, thus causing the contact failure. The conductive metal pin is press fit into the groove structure through which the actuator is inserted so as to allow electric contact between the metal pin and the shape-memory actuator. This may allow the actuator to be fixed to the casing.

One end of the metal pin is electrically connected to the electric wiring pattern formed on the printed circuit board via the adhesive agent such as the solder. The compact mount of the shape-memory actuator with small wiring structure may be realized. Furthermore, the heat generated by the shape-memory actuator is thermally conducted to the printed circuit board via the metal pin serving as a good heat conductor and the solder to realize improved heat release property of the shape-memory actuator, thus improving the response rate.

DESCRIPTION OF THE EMBODIMENTS

Figure 1:
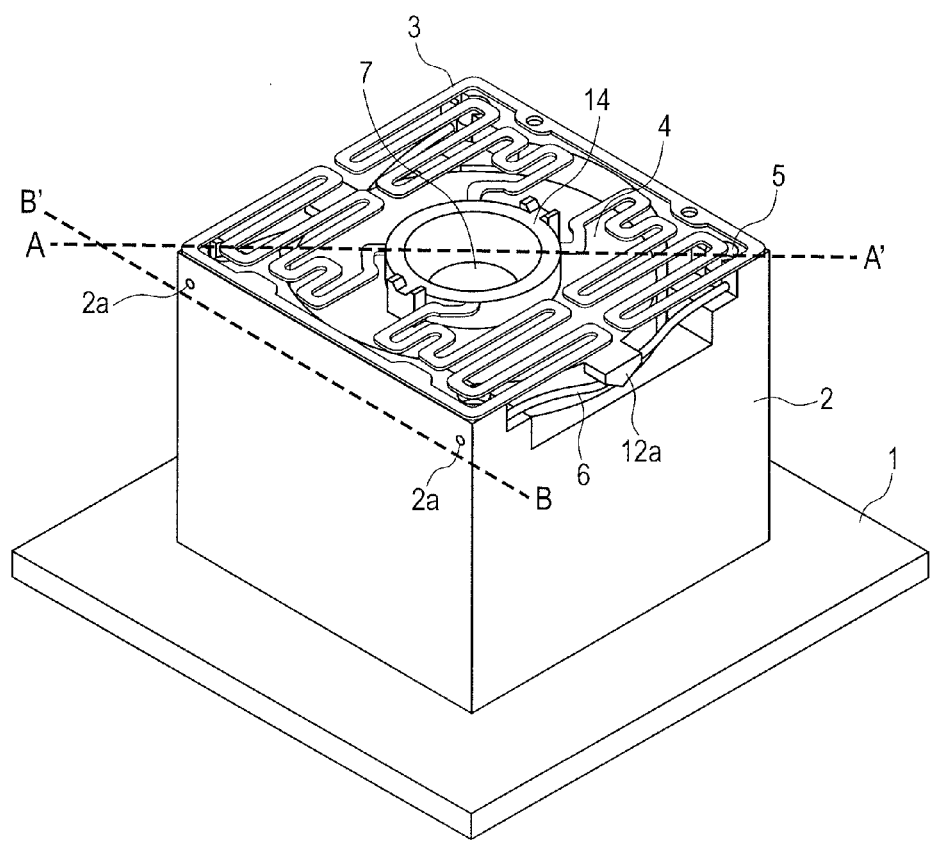
FIG. 1 is an explanatory view illustrating a camera module structure according to a first embodiment.

Embodiments of the invention will be described referring to the drawings.

First Embodiment

Figure 2:
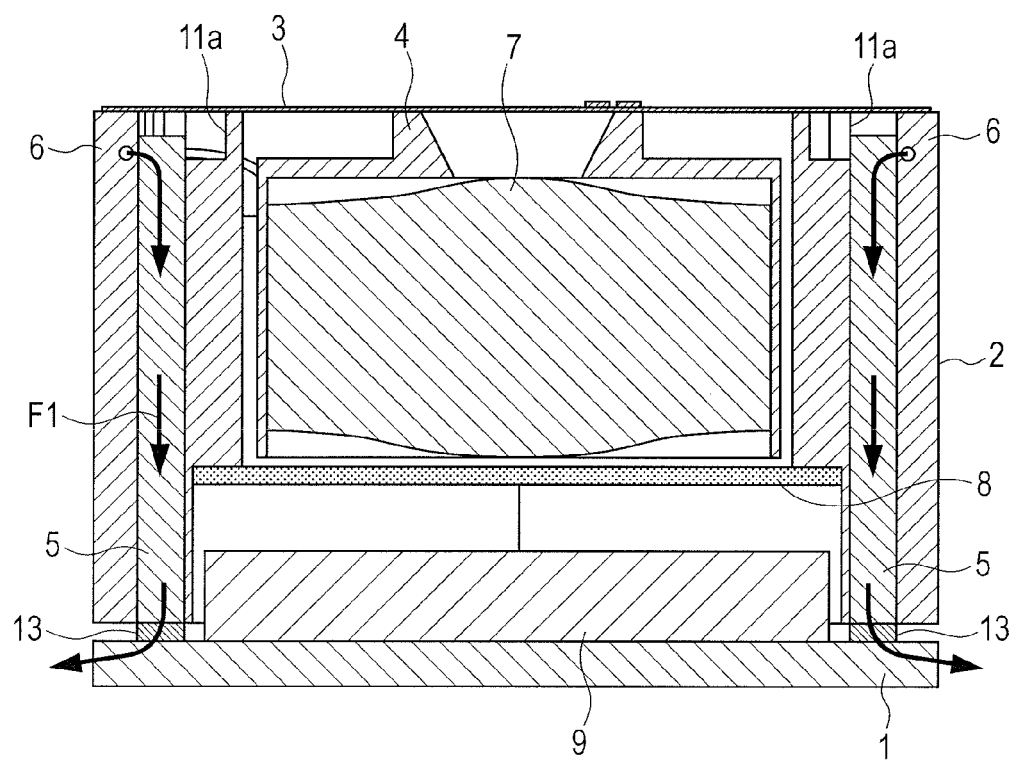
FIG. 2 is an explanatory view illustrating a cross-section structure of the camera module according to the first embodiment taken along line A-A'.
Figure 3:
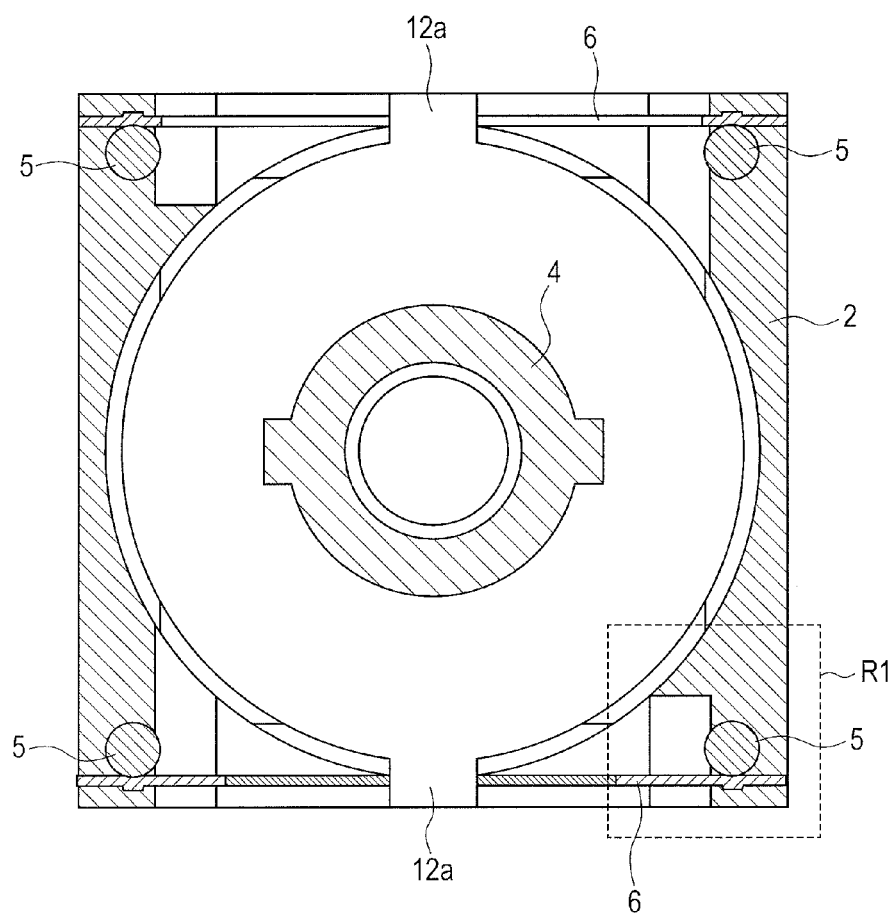
FIG. 3 is an explanatory view illustrating a cross-section structure of the camera module according to the first embodiment taken along line B-B'.
Figure 4:
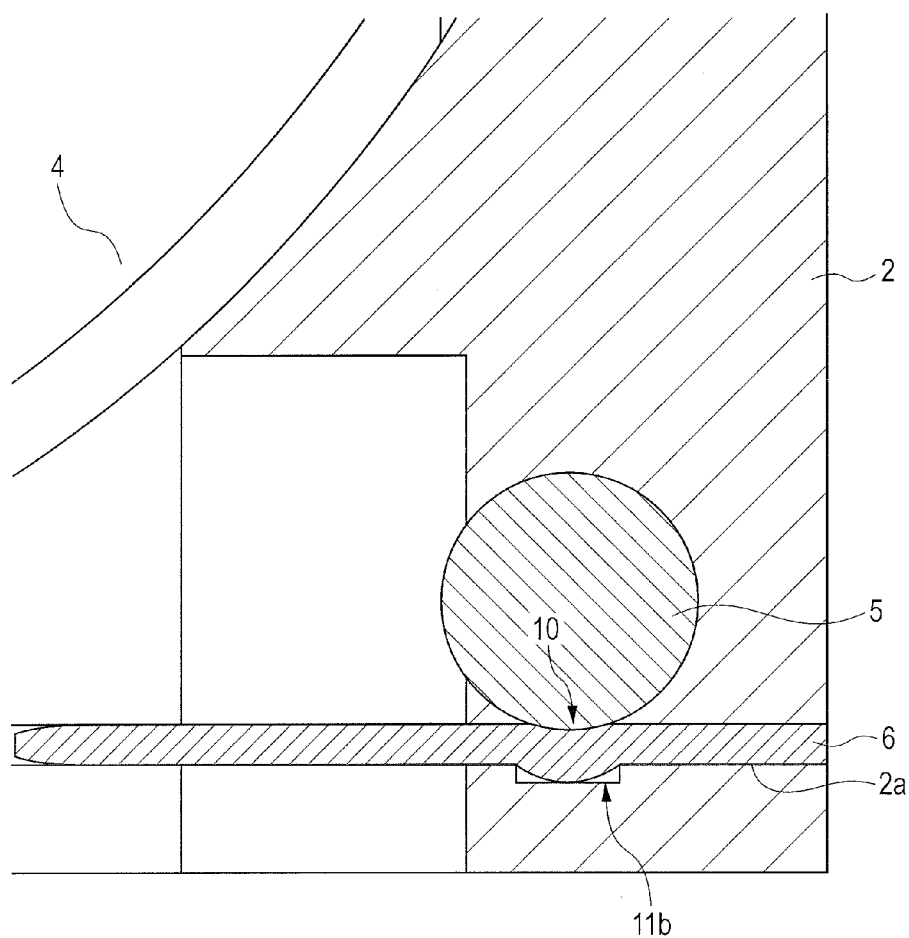
FIG. 4 is an explanatory view illustrating a portion for fixing a shape-memory actuator as a cross-section taken along line B-B'.

FIG. 1 is an explanatory view illustrating a basic structure of a camera module according to a first embodiment of the invention. FIG. 2 is an explanatory view of a vertical section of the structure shown in FIG. 1 taken along a broken line A-A'. FIG. 3 is an explanatory view of a horizontal section of the structure shown in FIG. 1 taken along a broken line B-B'. FIG. 4 is an enlarged view of a region R1 enclosed by a broken line shown in FIG. 3.

Figure 5:
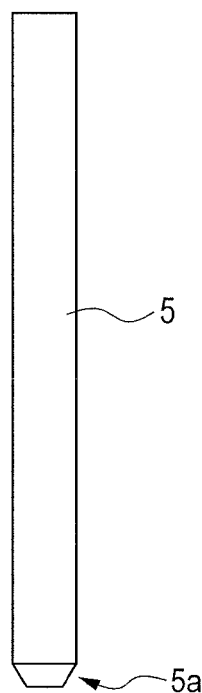
FIG. 5 is an explanatory view representing a metal pin structure according to the first embodiment.

FIG. 1 illustrates a printed circuit board 1, a camera casing 2, an insertion hole 2a of a shape-memory actuator wire, a plate spring 3 for pressurizing a lens holder, the lens holder 4 for fixing a lens 7, and a metal pin 5 which serves to fix a shape-memory actuator 6 while functioning as a conductor wire. FIG. 2 illustrates an infrared filter 8, an image pickup device 9, a solder 13 for bonding the metal pin and the printed wiring, and a flow F1 of the heat generated by the shape-memory actuator 6. FIG. 4 illustrates a contact point 10 between the metal pin and the shape-memory actuator 6, and a groove structure 11 which allows deformation of the shape-memory actuator which is pressed and bent by the metal pin so as to be fixed. FIG. 5 illustrates a chamfered portion 5a formed on one end surface of the metal pin.

The lens 7 is formed of plural lenses which are inserted into the lens holder 4 and adhered for fixation. The shape-memory actuator 6 is inserted from the shape-memory wire insertion holes 2a formed at both ends of the lens casing 2. The metal pin 5 with the chamfered portion 5a at the leading end is inserted into insertion holes 11a of the metal pin, which are formed in the lens casing 2 so as to allow the metal pin 5 to be easily inserted. The inserted metal pin 5 is in press contact with the shape-memory actuator 6, and electrically and thermally connected thereto. Then the contact between the shape-memory actuator 6 which expands and contracts in the drive stage and the metal pin 5 may be stabilized. The metal pin 5 and the printed circuit board 1 are further bonded through the solder 13 to realize good connection between the shape-memory actuator 6 and the printed circuit board 1 electrically and thermally.

The shape-memory actuator 6 is deformed by the metal pin 5 to be bent into a groove 11b which accommodates deformation of the shape-memory-alloy, and fixed to the lens casing 2.

Figure 7A:
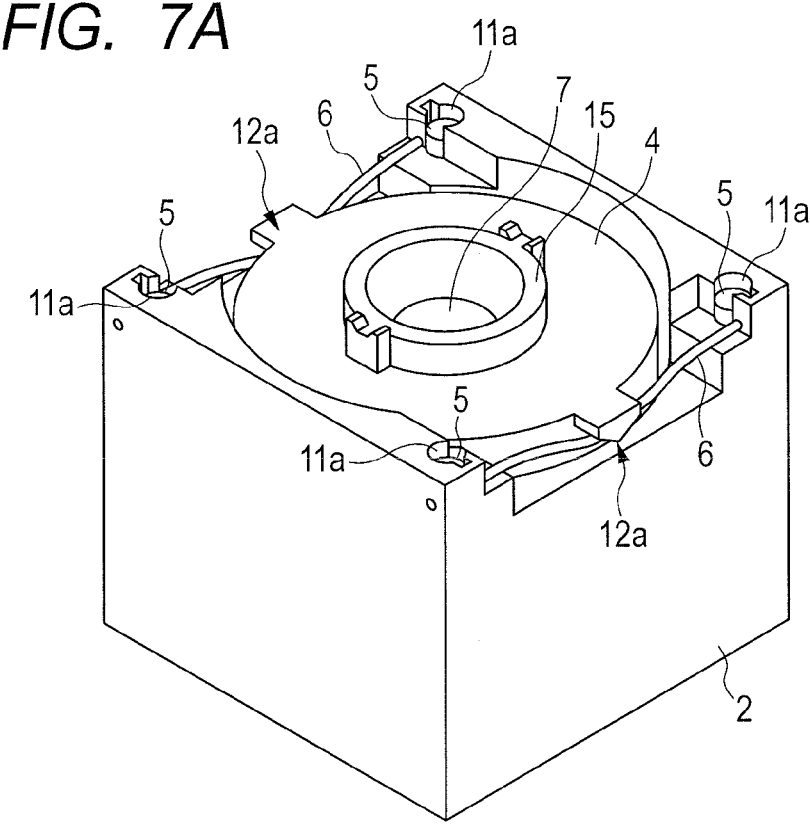
FIGS. 7A and 7B illustrate arrangements of the actuator and the metal probe according to first and fourth embodiments, respectively.

FIG. 7A illustrates the camera module shown in FIG. 1 having the plate spring 3 removed for explaining the structure. The lens holder 4 is positioned by the balance of the force for pressing the support beam 12a of the lens holder from one direction with the shape-memory actuator 6, and the force for pressing a lens holder contact surface 15 from the opposite direction with a ring-shaped contact portion 14 of the plate spring 3. Upon application of electric current via the metal pin 5, the shape-memory actuator 6 generates heat depending on the current value, and then extends or contracts to change the force for pressing the lens holder 4.

Figure 6:
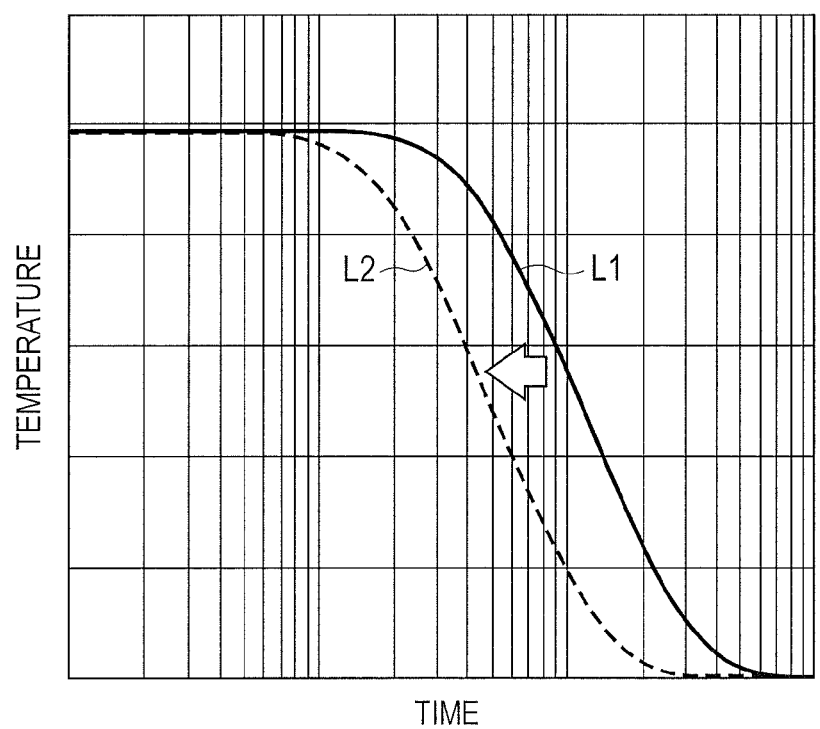
FIG. 6 is an explanatory view showing a relationship between a temperature of the actuator and time, which represents improvement of the heat release property resulting from the use of the metal pin according to a second embodiment.

The heat generated by the shape-memory actuator 6 is transferred to the metal pin 5. The heat is released from the printed circuit board 1 so that displacement of the lens holder 4 is determined in accordance with the balance of the heat generation and the heat release. The solid line L1 shown in FIG. 6 represents the heat release property of the shape-memory actuator 6. If the heat release capability is enhanced through improvement of the thermal conductivity of the lens casing 2, the temperature of the shape-memory actuator 6 may be decreased at the earlier stage as illustrated by the broken line L2. As a result, earlier displacement of the lens holder 4 may be realized.

Figure 8A:
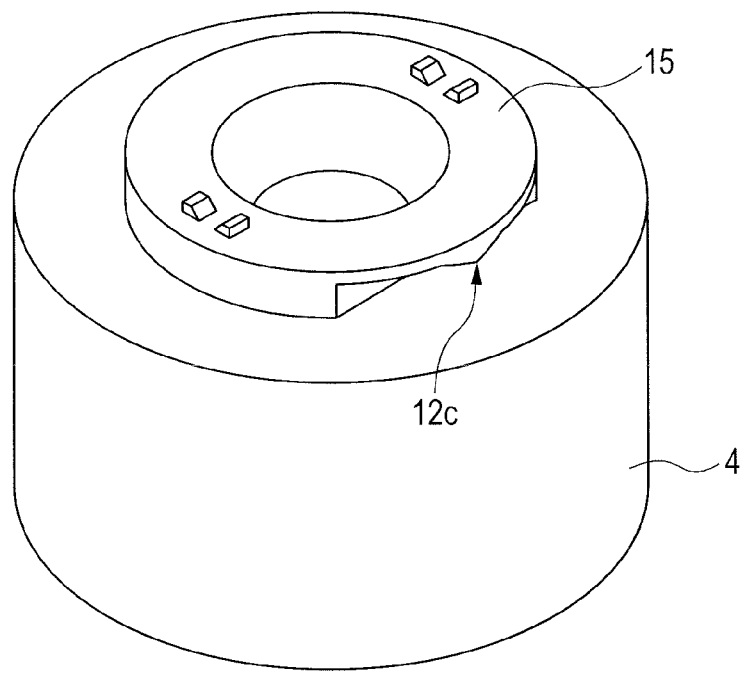
FIGS. 8A and 8B illustrate each support beam structure of the lens holder according to the first and fourth embodiments, respectively.
Figure 8B:
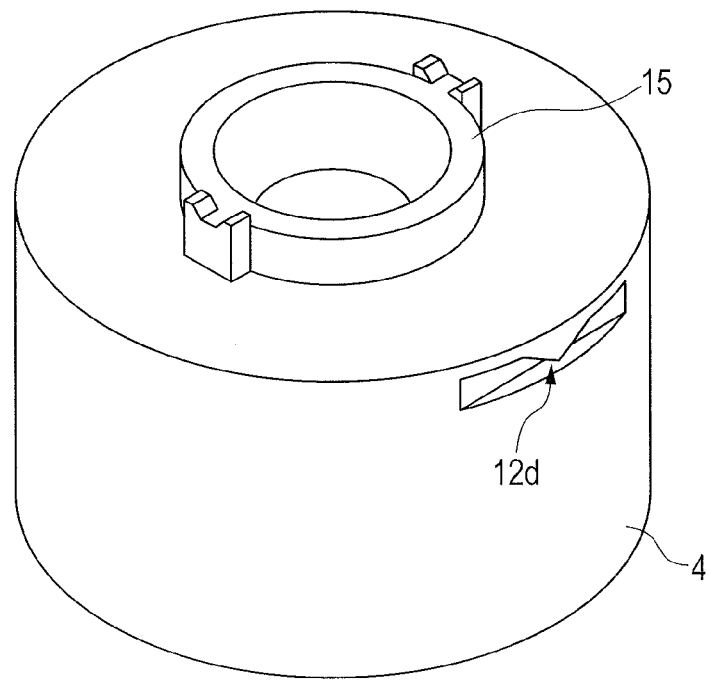

As described above, the shape-memory actuator 6 may be formed of the well known material such as the shape-memory-alloy and the polymer actuator. The beam for supporting the lens holder may be integrally formed with a beam 12d near the lens holder contact surface 15 of the lens holder as illustrated in FIG. 8B.

Second Embodiment

A second embodiment will be described.

The heat release means of the second embodiment is different from that of the first embodiment. The different structure will be described hereinafter.

In the second embodiment, the metal pin 5 and the plate spring 3 according to the first embodiment shown in FIG. 2 are thermally connected. The solid line L1 of FIG. 6 according to the first embodiment indicates the response expressed by the relationship between the temperature and time. Meanwhile, the shape-memory actuator 6 transfers and releases the generated heat to the plate spring 3 as the good thermal conductor via the metal pin 5 in addition to the general heat release only from the printed circuit board 1 via the metal pin 5 to improve the heat release property. Accordingly, the response rate of the actuator may be improved as shown by the broken line L2 of FIG. 6. The heat transferred to the plate spring 3 is brought into contact with ambient air while being released.

Connection between the metal pin 5 and the plate spring 3 is performed via the insulation film of the plate spring and the electrical insulating heat release grease. The resultant structure may be compact while ensuring good response rate, which are substantially the same advantages as those derived from the first embodiment.

Third Embodiment

A third embodiment will be described.

The actuator of the third embodiment is different from that of the first and the second embodiments. The arrangement and outer appearance of the structure according to the third embodiment are substantially the same as those of the first embodiment. However, the shape-memory actuator 6 is configured to expand and contract under the electric field generated by voltage application, for example, as an ion conduction polymer actuator. It has such feature as small heat generation amount, requiring no consideration with respect to the heat release.

Fourth Embodiment

A fourth embodiment will be described.

In the fourth embodiment, the actuator of the camera module according to the first and the second embodiments is differently arranged. The arrangement different from that of the first and the second embodiments will be described.

Figure 7B:
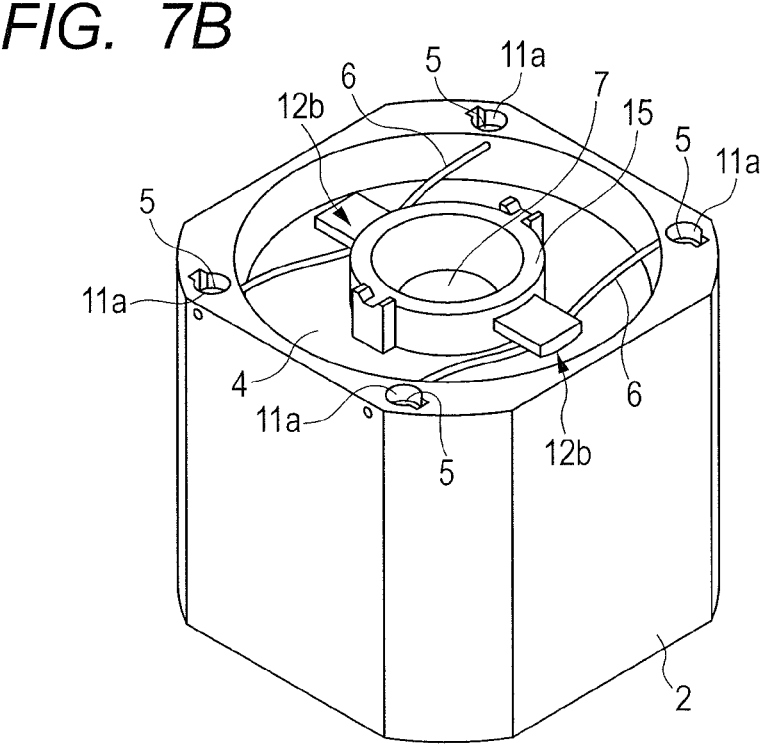

Each of FIGS. 7A and 7B illustrates the camera module having the plate spring removed for explaining the first and the fourth embodiments, respectively. In the first embodiment, the beam 12a for supporting the lens holder is formed on the outer circumference of the lens holder. Meanwhile, in the fourth embodiment, the beam 12b is formed on the outer circumference of an annular portion of the lens holder contact surface 15 above the lens holder. The shape-memory actuator 6 and the metal pin 5 associated therewith are arranged closer to the centrally positioned lens 7 than the arrangement of the first and the second embodiments, thus allowing the compact structure. The lens holder may be structured to have the beam 12c or 12d for supporting the lens holder arranged therein as illustrated in FIGS. 8A and 8B. As a result, the shape-memory actuator 6 and the metal pin 5 associated therewith may be arranged closer to the centrally positioned lens 7, resulting in the compact structure.

The beam for supporting the lens holder, for example, the beam 12c shown in FIG. 8A may be integrally formed near the lens holder contact surface 15 of the lens holder 4.

Fifth Embodiment

A fifth embodiment will be described.

Figure 12:
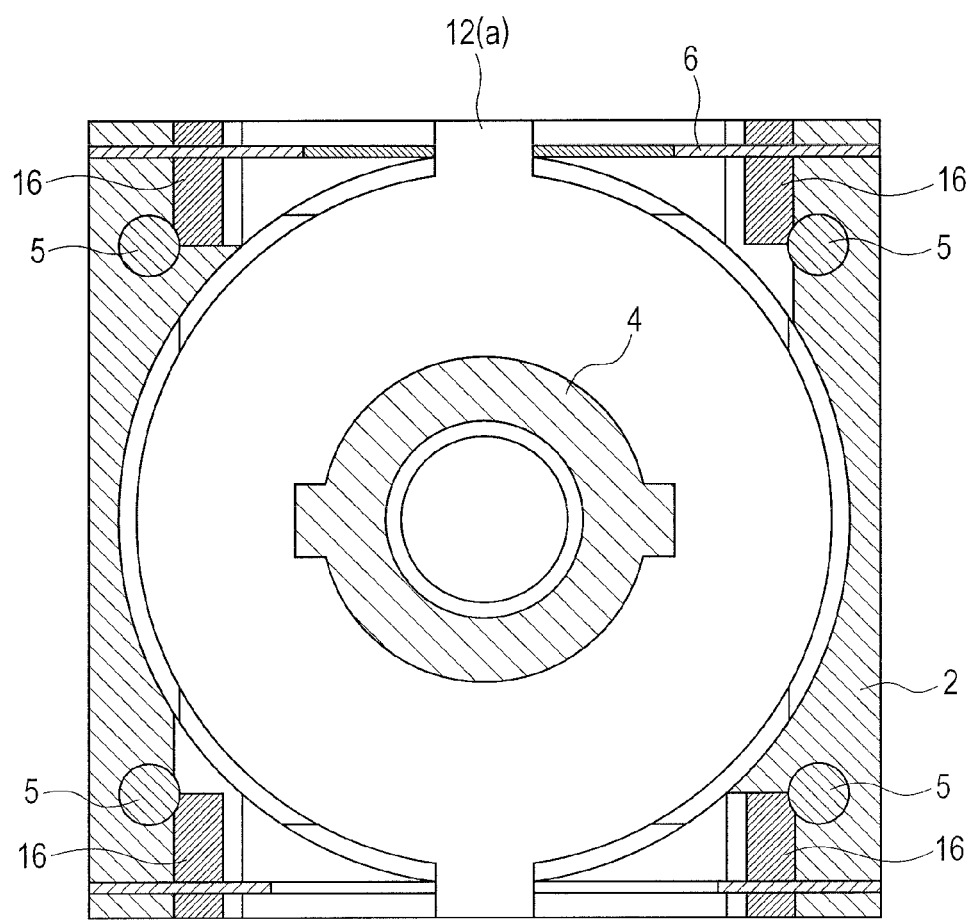
FIG. 12 is a horizontal sectional view of the camera module according to a fifth embodiment.

In the fifth embodiment, a method for fixing the shape-memory actuator 6 according to the first embodiment is different. The different feature from the first embodiment will be described. FIG. 12 illustrates a horizontal section of the fifth embodiment likewise FIG. 3. In the fifth embodiment shown in FIG. 12, the shape-memory actuator 6 and the metal pin 5 are electrically and thermally connected via the conductive material such as the conductive plate and an adhesive agent 16. In the fifth embodiment, the metal pin 5 and the shape-memory actuator 6 do not have to be in contact with each other. This may improve flexibility of arranging the respective components, for example, the metal pin 5 may be arranged to be closer to the lens center compared with the first embodiment.

Sixth Embodiment

A sixth embodiment will be described.

In the sixth embodiment, the material for forming the lens holder 4 or the lens holder 4 and the lens casing 2 is different from that of the first embodiment. The different feature from the first embodiment will be described. In the sixth embodiment, the material with high thermal conductivity and electric insulation property to which the inorganic ceramics filler powder such as alumina ($Al_2O_3$) and silica ($SiO_2$), which exhibits the heat conductivity higher than the general resin by double digits is employed for forming the lens holder 4, or the lens holder 4 and the lens casing 2. The beam 12a is allowed to efficiently perform thermal conduction to the lens holder 4 so as to be in contact with and thermally conduct the center of the shape-memory actuator 6, which has the temperature increased to be the highest. Similarly, the lens casing 2 releases the heat generated by the shape-memory actuator 6 through thermal conduction, thus improving the response rate.

Seventh Embodiment

A seventh embodiment will be described.

Figure 9:
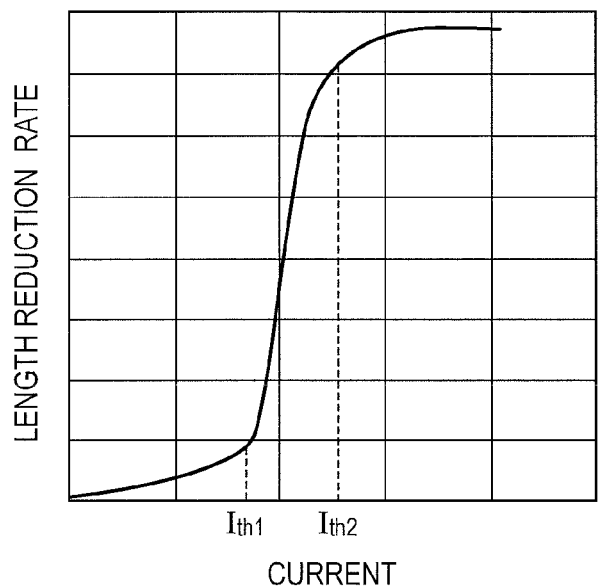
FIG. 9 is an explanatory view representing a relationship between current and strain of the shape-memory-alloy according to the seventh embodiment.
Figure 10A:
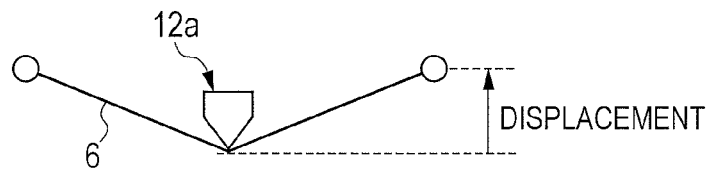
FIGS. 10A and 10B represent an arrangement of the actuator according to the first embodiment, and each relationship between the strain and displacement of the actuator according to the seventh and eighth embodiments.
Figure 10B:
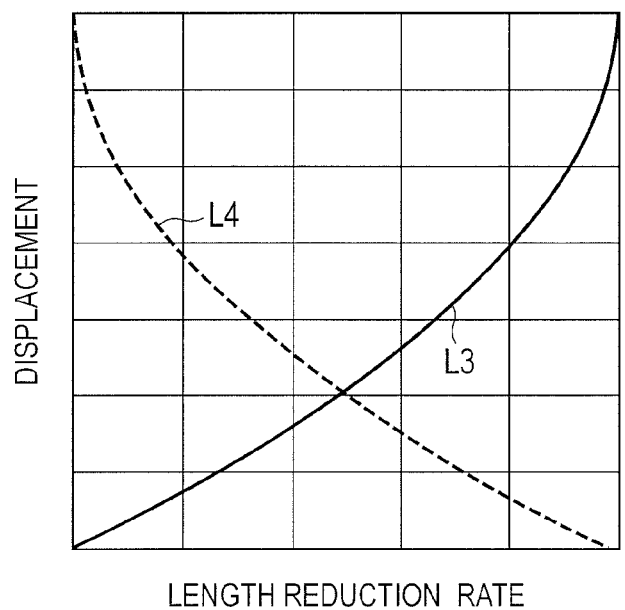
Figure 11:
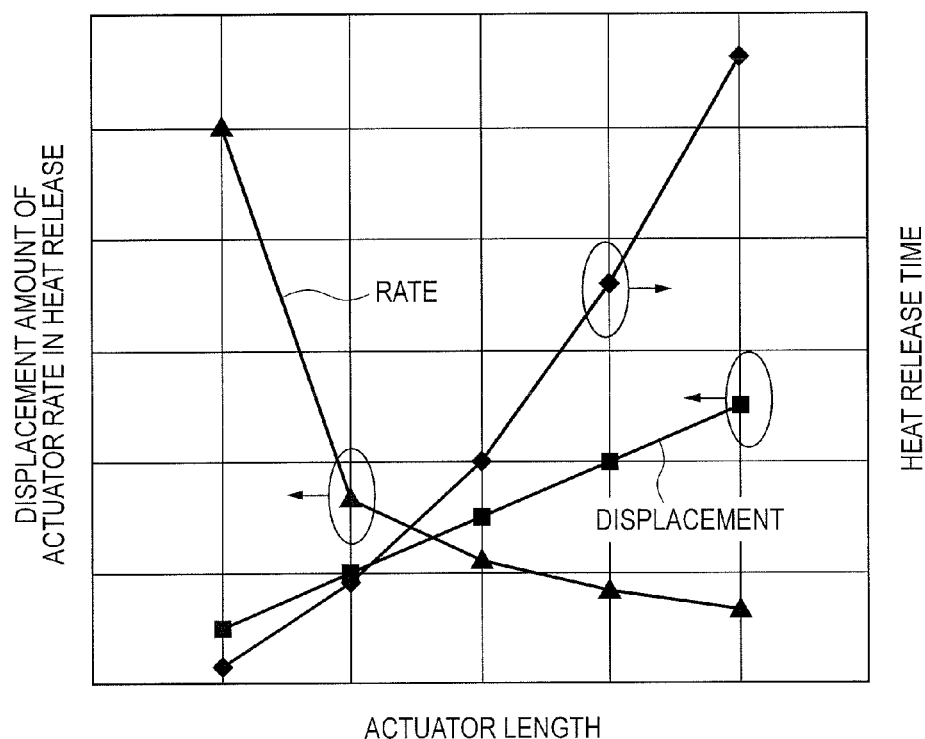
FIG. 11 is an explanatory view representing relationships between the length of the actuator and heat release time, and between the amount of displacement and rate of the actuator during the heat release according to the first embodiment.

In the seventh embodiment, the shape-memory actuator 6 according to the first embodiment is formed of the shape-memory-alloy. The length of the shape-memory-alloy largely changes depending on the drive current at values of threshold current $I_{th1}$ and $I_{th2}$ as illustrated in FIG. 9. For this, both ends of the shape-memory actuator 6 formed of the shape-memory-alloy are fixed, and the support beam 12a for the lens holder is arranged at the center of the actuator which is formed to have a V-like shape as shown in FIG. 10A. In the structure, the length of the shape-memory actuator 6 is decreased as the electric current is applied. The displacement of the support beam 12a for the lens holder then shows the feature as indicated by the solid line L3 of FIG. 10B relative to the length reduction rate. Those features show the tendency that the displacement of the actuator formed of the shape-memory-alloy is largely increased when the drive current exceeds the threshold value $I_{th1}$. The actuator is formed of the shape-memory-alloy which has the length decreased under heat resulting from current application, and returns to the original length by the heat release. Referring to FIG. 11, heat accumulated in the actuator is increased depending on the length of the actuator, requiring long time for the heat release and decreasing the response rate. Meanwhile, the displacement of the actuator is increased depending on the length of the actuator. So the relationship between the rate and the displacement becomes contradictory. The shorter the length of the actuator becomes, the higher the rate of the actuator upon heat release becomes so long as the length of the actuator satisfies the requirement of the necessary displacement. This makes it possible to provide the compact structure.

Eighth Embodiment

An eighth embodiment will be described.

Unlike the seventh embodiment, the shape-memory actuator 6 of the eighth embodiment is a polymer actuator of current application heat type. The basic feature, however, is the same. The feature different from the seventh embodiment will be described. The polymer actuator of current application heat type is formed of a conductive polymer, and expands depending on the flowing current value. In the linear form of the shape-memory actuator as shown in FIG. 7, the length is increased depending on the current value. The displacement of the actuator relative to the drive current value is oppositely directed to the case of the actuator formed of the shape-memory-alloy in the seventh embodiment to establish the relationship between the strain and the actuator displacement indicated by the broken line L4 of FIG. 10. The polymer actuator may be manufactured using the coating technique, which is allowed to manufacture the arbitrarily shaped structure at lower costs.

What is claimed is:

1. A camera module comprising:
a camera casing;
a lens holder slidably attached to a shaft formed at the center of the casing;
a plate spring provided to constantly press the lens holder;
a support beam of the lens holder, which is formed on its circumference for supporting the lens holder;
operation means using an actuator of current application heat type with a V-like shape, which thermally expands and contracts having terminals provided at both ends of one side of the casing while applying a pressing force against a force of the plate spring applied to the lens holder; and
a conductive metal pin having one end surface conically chamfered, wherein the metal pin is inserted into a cylindrical hole formed in the camera casing to be in contact with the actuator, and further pressurizes to electrically contact the metal pin and the actuator, and to fix the actuator to the casing.

2. The camera module according to claim 1, wherein:
one end of the metal pin is electrically connected to an electric wiring pattern formed on a printed circuit board via an adhesive agent as a solder to apply a drive current passing through the camera casing from the printed circuit board to the actuator to reduce an additional wiring for size reduction; and
heat generated by the actuator is thermally conducted to the printed circuit board via the conductive metal pin and the solder.

3. The camera module according to claim 2, wherein the actuator is of a voltage drive type as an ion conductive polymer actuator.

4. The camera module according to claim 2, wherein the actuator is an ion conduction polymer actuator.

5. The camera module according to claim 2, wherein:
one end of the metal pin is thermally connected to the plate spring; and
a heat generated by the actuator is thermally conducted to the plate spring via the metal pin, and released.

6. The camera module according to claim 2, wherein:
the support beam for the lens holder is provided above an upper surface of the lens holder; and
the actuator is provided near the lens at a center.

7. The camera module according to claim 2, wherein the actuator and the metal pin are electrically connected via a conductive material as a conductive adhesive agent.

8. The camera module according to claim 2, wherein the actuator and the metal pin are electrically connected via a conductive adhesive agent.

9. The camera module according to claim 2, wherein the lens holder, or each of the lens holder and the lens casing is electrically insulated, and thermally conducts and releases a heat generated by the actuator.

10. The camera module according to claim 2, wherein a shape-memory-alloy is employed for forming the actuator.

11. The camera module according to claim 2, wherein a polymer actuator of current application heat type is used as the actuator.

12. The camera module according to claim 1, wherein the actuator is of a voltage drive type as an ion conductive polymer actuator.

13. The camera module according to claim 1, wherein the actuator is an ion conduction polymer actuator.

14. The camera module according to claim 1, wherein:
one end of the metal pin is thermally connected to the plate spring; and
a heat generated by the actuator is thermally conducted to the plate spring via the metal pin, and released.

15. The camera module according to claim 1, wherein:
the support beam for the lens holder is provided above an upper surface of the lens holder; and
the actuator is provided near the lens at a center.

16. The camera module according to claim 1, wherein the actuator and the metal pin are electrically connected via a conductive material as a conductive adhesive agent.

17. The camera module according to claim 1, wherein the actuator and the metal pin are electrically connected via a conductive adhesive agent.

18. The camera module according to claim 1, wherein the lens holder, or each of the lens holder and the lens casing is electrically insulated, and thermally conducts and releases a heat generated by the actuator.

19. The camera module according to claim 1, wherein a shape-memory-alloy is employed for forming the actuator.

20. The camera module according to claim 1, wherein a polymer actuator of current application heat type is used as the actuator.

* * * * *